United States Patent

[11] 3,613,691

| [72] | Inventor | Albert R. Wilshusen |
| | | 116 East Cedar St., Liberal, Kans. 67901 |
| [21] | Appl. No. | 873,910 |
| [22] | Filed | Nov. 4, 1969 |
| [45] | Patented | Oct. 19, 1971 |

[54] GRAIN SEPARATOR FOR COMBINES
9 Claims, 8 Drawing Figs.

[52] U.S. Cl. .................................................. 130/23
[51] Int. Cl. .............................................. H01f 12/32
[50] Field of Search ........................................ 130/22,
22.1, 23, 24, 25, 27, 27.6, 27.17

[56] References Cited
UNITED STATES PATENTS

| 951,270 | 3/1910 | Eves | 130/27 |
| 1,251,187 | 12/1917 | Davis | 130/27.17 |
| 1,949,725 | 3/1934 | McDow | 130/23 |
| 2,995,135 | 8/1961 | Krum | 130/23 |
| 3,109,434 | 11/1963 | Strever | 130/24 |

FOREIGN PATENTS

| 118,121 | 2/1944 | Australia | 130/23 |
| 850,815 | 10/1960 | Great Britain | 130/27.6 |

*Primary Examiner*—Antonio F. Guida
*Attorneys*—Clarence A. O'Brien and Harvey B. Jacobson ABSTRACT: A grain separator disposed at the discharge of the threshing cylinder receiving grain, straw and chaff therefrom and separating the grain from the straw and chaff including a perforated auger with rake teeth on the periphery thereof disposed in overlying relation to a grain sieve together with fans and a collecting pan and auger assembly for the grain and a recleaner which will recirculate a portion of the grain which has been incompletely cleaned to the threshing cylinder.

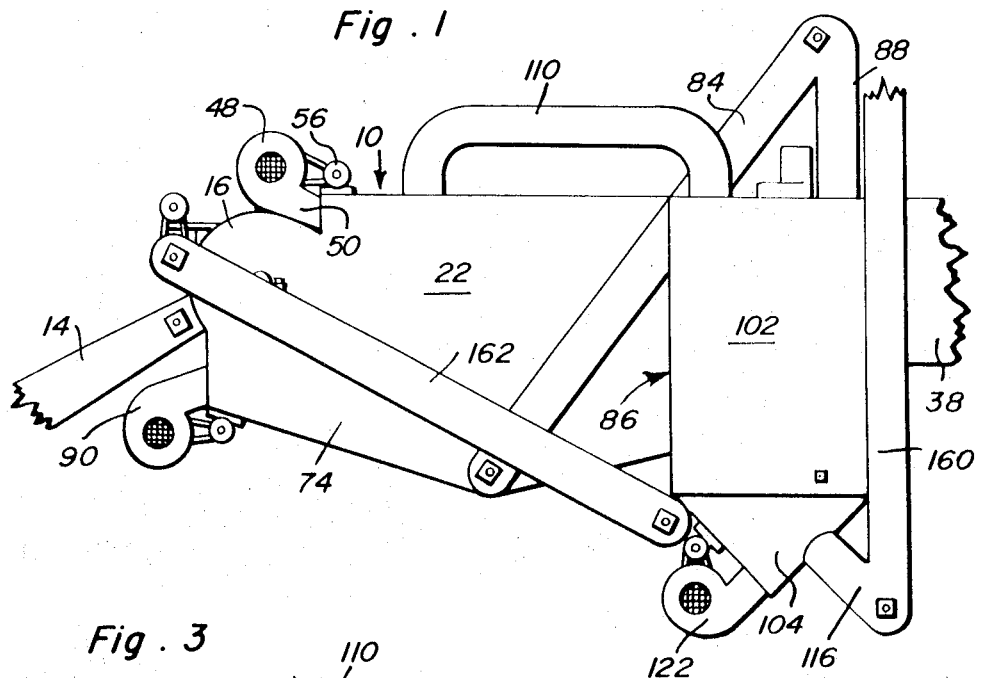
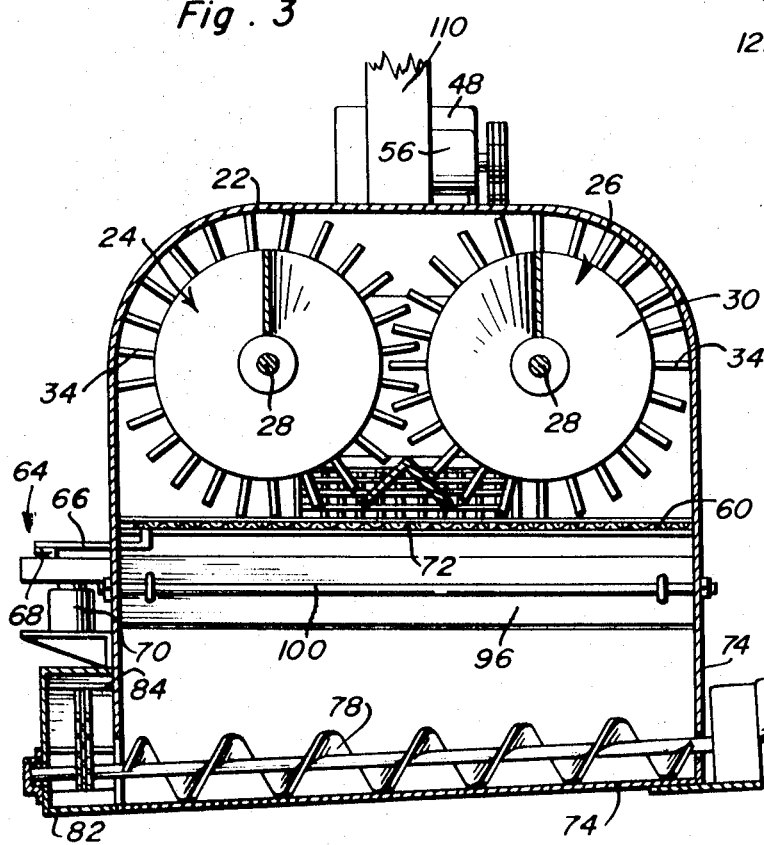

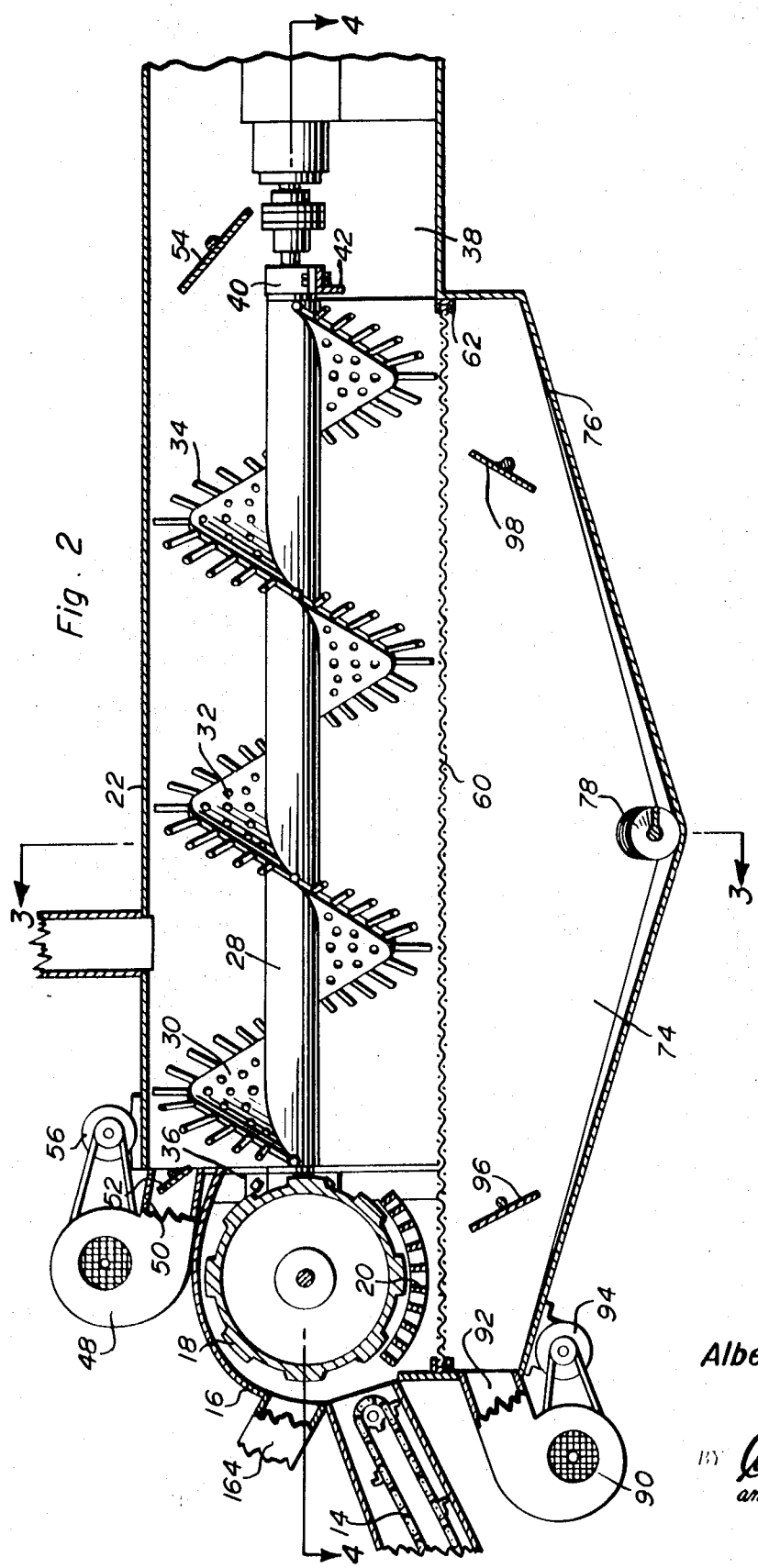

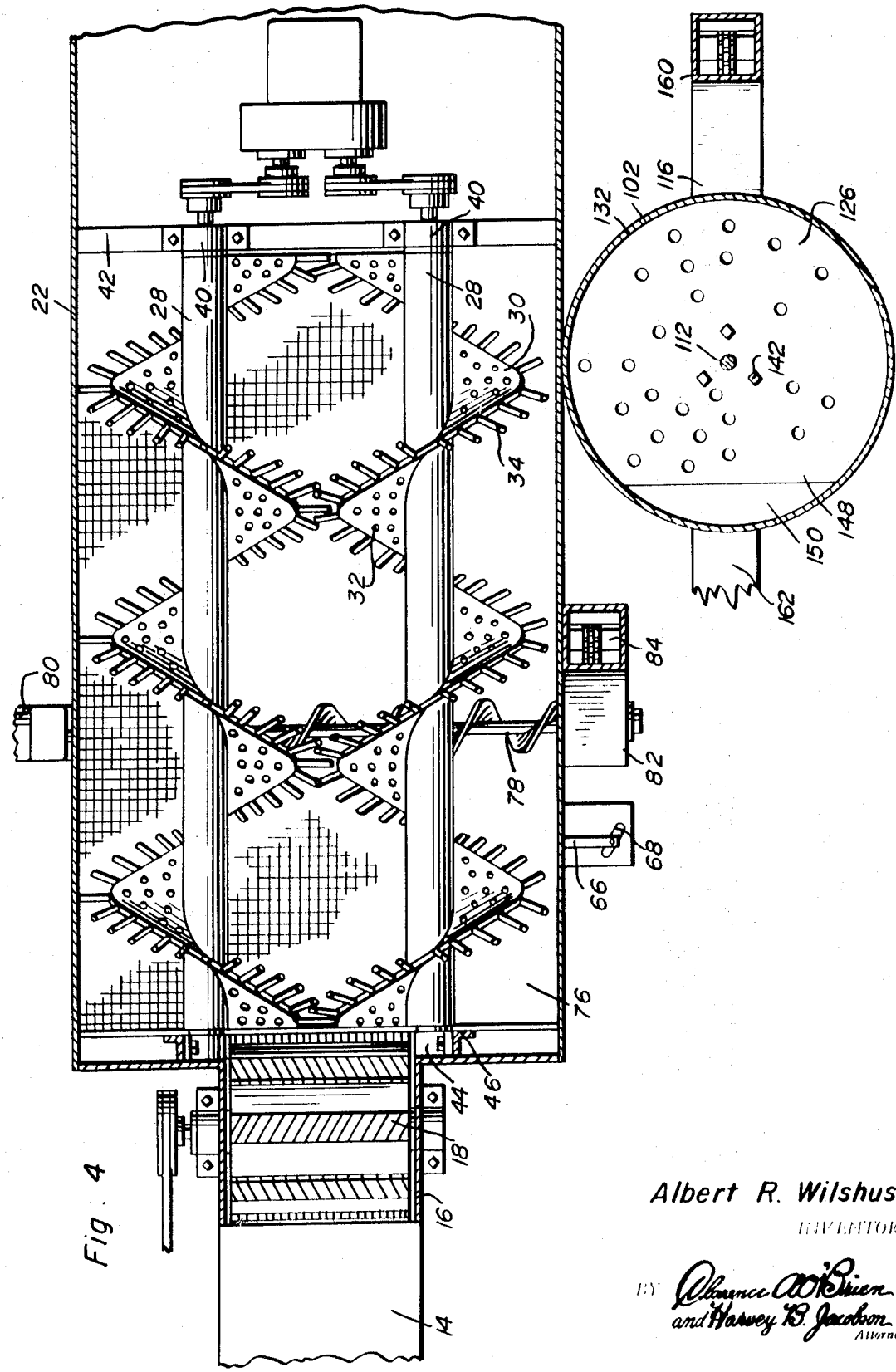

PATENTED OCT 19 1971 3,613,691

Albert R. Wilshusen
INVENTOR.

BY Clarence A. O'Brien
and Harvey B. Jacobson
Attorneys

GRAIN SEPARATOR FOR COMBINES

The present invention generally relates to a grain separator and more particularly a separator for use in a combine to render the combine more efficient in separating grain from straw and chaff and yet retain the combine compact in size.

In conventional combine structures, the standing grain is cut by a cutter head and conveyed into a threshing area which includes a rotatable threshing cylinder, grate bars associated therewith and a structure for separating the grain from the straw and chaff, discharging the straw and chaff from the rear of the combine and discharging the grain into a storage bin or the like. It is an object of the present invention to provide a grain separator for use rearwardly of the threshing cylinder and grate bars which serves to separate the straw and grain in an efficient manner and which replaces the usually provided separating beater, straw walkers, chaffer and sieve as employed in conventional combines.

An object of the invention is to provide a grain separator having auger structures associated with the threshing cylinder to receive threshed grain, straw and chaff therefrom with the auger including fingers for moving the straw and perforated flights to facilitate separation of grain from chaff and straw.

Another object of the invention is to provide a grain separator in accordance with the preceding objects which also includes a grain recleaner in the form of a cylindrical member having rotatable elements therein for separating cleaned grain from grain with hulls thereon which are returned to the threshing cylinder while the cleaned grain is carried to a storage bin or the like.

A further object of the present invention is to provide a grain separator incorporating a series of fans oriented to clean the grain with the air currents being retained within the machine itself for a substantial part of its path.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a side elevational view of a portion of a combine with the grain separator incorporated therein;

FIG. 2 is a longitudinal, sectional view of the grain separator illustrating one of the augers forming a part of the combine;

FIG. 3 is a transverse, sectional view taken substantially upon a plane passing along section line 3—3 of FIG. 1 illustrating the structural details of the invention;

FIG. 4 is a longitudinal, plan view taken substantially upon a plane passing along section line 4—4 of FIG. 2 illustrating further structural details of the grain separator;

Figure 5:
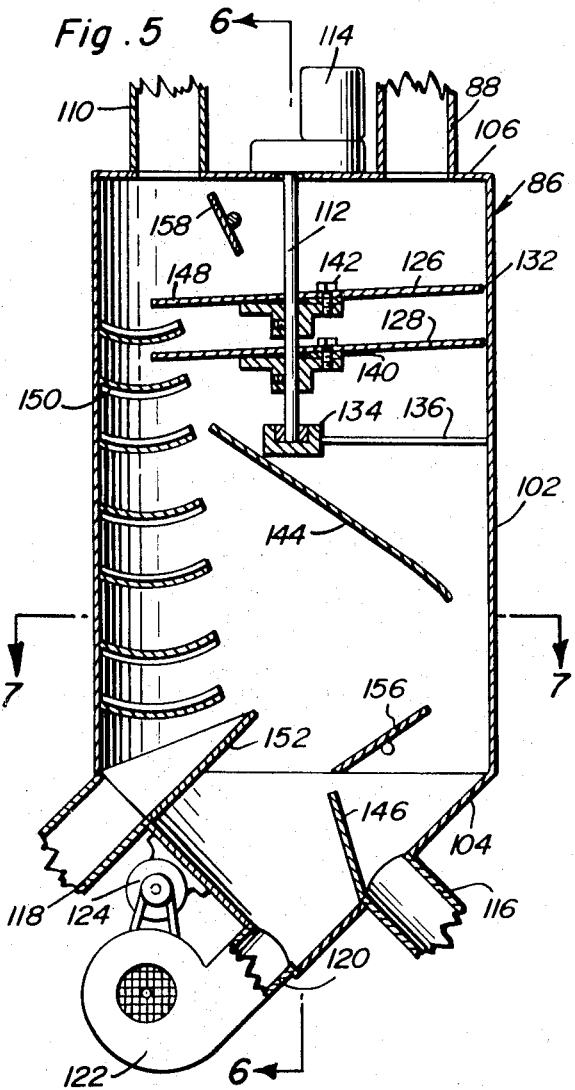
FIG. 5 is a vertical sectional view of the grain recleaner.

Referring now specifically to the drawings, the numeral 10 generally designates the grain separator of the present invention which is associated with a combine structure. The combine structure includes the usual conveyor assembly 14 which conveys the grain heads and straw attached thereto from the cutting head of the combine structure. The conveyor discharges the straw and grain heads into a threshing chamber 16 having the usual rotatably driven threshing cylinder 18 therein associated with the usual grate 20 in the form of bars arranged arcuately about a portion of the circumference of the threshing cylinder 18. The threshing cylinder 18 and grate 20 operates in the same manner as in a conventional combine and the threshing cylinder 18 is driven in any suitable manner.

Communicated with and forming a continuation of the threshing chamber 18 is a separating chamber or housing 22 which is elongated and extends laterally outwardly from the circumference of the threshing cylinder 18. Positioned in the separating chamber 22 is a pair of auger conveyors 24 and 26 each of which includes a central shaft 28 and a perforated spiral flight 30 which has perforations 32 substantially throughout the area thereof. Projecting outwardly from the outer edge of the flight 30 is a plurality of rake teeth 34 which are oriented in such a manner that the tip ends of the rake teeth 34 will slightly overlap at the adjacent points of the flight as illustrated in FIG. 4. The auger conveyors 24 and 26 extend from the discharge opening 36 of the threshing chamber 16 to discharge duct 38 for straw and chaff which may discharge rearwardly of the machine in a conventional manner. The outer ends of the shafts 28 are supported by bearing assemblies 40 supported by a transverse support 48 and the inner ends thereof are supported by supporting bearing assemblies 44 supported by vertical supports 46.

A fan assembly 48 is supported from the separating chamber 22 and includes a discharge conduit or duct 50 communicating with the front wall of the separating chamber 22 for discharging air into the separating chamber 22. An adjustable windboard 52 is provided in the inlet for the air and an adjustable windboard 54 is provided adjacent the discharge of the separating chamber 22. The fan 48 may be driven by any suitable mechanism such as an electric motor 56 or by any of the suitable pulley and belt or sprocket chain assembly.

Disposed in underlying relation to the augers 24 and 26 is a grain sieve in the form of a perforated member 60 having the end edges thereof slidably received in inwardly facing channel-shaped guides 62 on the opposed end walls of the separating chamber 22.

The drain sieve 60 is reciprocated horizontally by a drive assembly generally designated by the numeral 64 and which includes a drive member 66 which is driven from an eccentric 68 that in turn is driven by a suitable motor such as an electric motor 70 or the like to reciprocate and agitate the sieve 60 to separate grain from the straw and chaff as it moves along the upper surface of the sieve 60 which forms a bottom for the chamber which receives the augers 24 and 26. An inverted V-shaped divider 72 is disposed below the augers 24 and 26 to prevent collection of straw in this area as illustrated in FIG. 3. The divider member 72 separates the chamber 22 into two areas receiving the two augers 24 and 26. An enlarged grain pan 74 is disposed below the sieve 60 for receiving grain therefrom. The grain pan 74 includes bottom panels 76 which incline downwardly to a lower central point and the bottom panels 76 also incline from one side edge of the grain pan to the other as illustrated in FIG. 3 so that all grain discharged through the sieve 60 will be collected by the grain pan 74. Oriented in the lowest part of the grain pan 74 is a screw auger 78 driven by a suitable electric motor or the like 80 at the upper end thereof with the lower end of the auger 78 discharging into an elevator hopper 82 which is in communication with an elevator 84 to discharge the material dropping into the grain pan 74 into the upper end of a recleaner 86 through an inlet pipe 88 thereto. A fan 90 is mounted at the front end of the grain pan 74 and discharges through an opening 92 into the grain pan with the fan being driven by a suitable electric motor 94 of any other suitable drive means. Also, positioned in the grain pan 74 is a pair of adjustable windboards 96 and 98 for directing the airflow path through the grain pan and up through the sieve 60 with some of the air also passing through the elevator hopper 82 and elevator 84. As illustrated, the windboards 96 are supported on transverse shafts or rods 100 which may be adjustably secured in position exteriorly of the drain pan or permanently installed and adjusted by the use of adequate clamp devices for securing the windboards 96 and 98 in adjusted position.

The grain recleaner 86 is illustrated in FIGS. 5-8 and includes a vertically disposed cylindrical tank or housing 102 having an inverted conical-shaped lower end 104 and a flat top 106 with which the inlet duct 88 is communicated. The top 106 is also provided with an air duct 110 which extends to and communicates with the top of the threshing chamber 22 as illustrated in FIG. 1. Disposed centrally within the cylindrical separator 102 is a depending rotatable shaft 112 driven by a suitable electric motor 114 or other suitable drive means on the top 106 of the cylindrical tank 102. The lower end of the tank 102 which is conical as at 104 includes an outlet 116 for cleaned grains, an outlet 118 for grain with hulls thereon and an air inlet duct 120 communicated with a fan 122 driven by a suitable electric motor 124 or other drive means for discharging air into the bottom apex of the recleaner 86. Air passing through the recleaner will entrain chaff and other lightweight material such as residual straw or the like and convey it through the air duct 110 back into the separating chamber 22 for discharge up through the discharge duct 38.

Mounted on the shaft 112 is a pair of grain sieves or pans 126 and 128 which are perforated and have a partially circular edge 132 disposed adjacent the interior wall of the cylindrical recleaner 102. The lower end of the shaft 112 is supported by a bearing member 134 supported by a bracket structure 136 from the wall of the recleaner 102 and each of the sieve pans 126 and 128 is supported on a hub member 138 attached to the shaft 112 by a suitable setscrew. Disposed between each of the pans 126 and 128 and its respective hub is a wedge-shaped spacer or shim 140 which inclines the pan 126 and 128 with the spacer 140 being removably secured in place by a bolt 142 and the like. Underlying the sieve assembly is a baffle 144 which has an upper edge disposed on the side of the shaft 112 remote from the circular edges of the pans 126 and 128. The lower edge of the baffle 144 is disposed adjacent the periphery of the cylindrical housing 102 for discharging all of the grain passing through the sieves 126 and 128 toward one side of the cylindrical recleaner 102 for collection by an upwardly inclined baffle 146 at the lower edge of the outlet opening 116. Thus, all grain passing down through the sieves 126 and 128 will be deflected by the baffle 144 and collected by the baffle 146.

Figure 6:
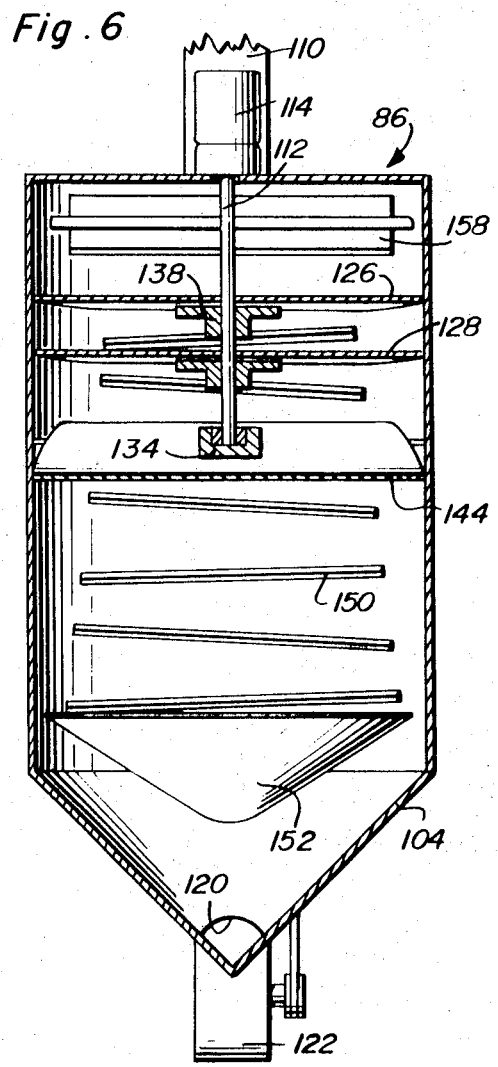
FIG. 6 is a vertical sectional view taken substantially upon a plane passing along section line 6—6 of FIG. 5 illustrating further structural details of the grain recleaner.
Figure 7:
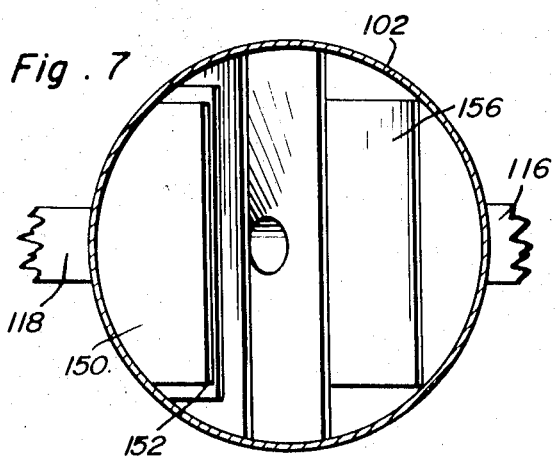
FIG. 7 is a plan sectional view taken substantially upon a plane passing along section line 7—7 of FIG. 5 illustrating further structural details of the grain recleaner.
Figure 8:
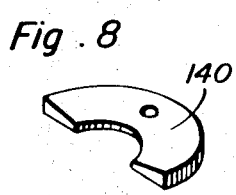
FIG. 8 is a perspective view of one of the insert elements employed for inclining the pans in the grain recleaner.

The opposite edges of the pans 126 and 128 from the circular edge 132 are spaced from the peripheral wall as designated by the numeral 148. The edges 148 of the pans 126 and 128 overlie a series of inclined pans or troughs 150 attached to the interior wall of the cylindrical recleaner 102 with the lower end of an uppermost pan discharging into the upper end of a lower pan in a zigzag manner as illustrated in FIG. 6. The lowermost pan or trough 150 discharges into a scooplike projection 152 which directs material into the discharge 118 so that grain with hulls thereon will be discharged down the trough ladder defined by the trough 150 into the scooplike projection 152 and out to the discharge 118. Air boards 156 and 158 are provided for directing air through the recleaner so that any lightweight chaff or the like will be entrained by air passing therethrough and discharged through the air duct 110.

The discharge pipe 116 is in the form of an inlet for an elevator 160 which extends to a storage bin or other conveyance for cleaned grain. The discharge pipe 118 is in the form of an inlet to an elevator or conveyor 162 which extends back to the threshing chamber 16 and terminates in an inlet 164 which discharges the grains with hulls thereon back into the threshing chamber for passage through the threshing cylinder. Thus, the grain which is completely cleaned is conveyed to a storage bin while the grain having hulls still associated therewith is returned to the entrance of the threshing chamber 16 for passage through the apparatus for further cleaning.

The various drive mechanisms may be separate electric motors geared to drive at a predetermined rotational speed and where the sieves 60, 126 and 128 are driven, a suitable oscillating output device is employed which may be equivalent to that employed for oscillating the agitator in a washing machine. Rather than using separate electric motors for various drives, various gearing, shafting, belt and pulley, sprocket gear and chain or any other equivalent mechanical drive connection may be employed for connection with suitable power sources normally provided on a combine such as a prime mover having output shafts, pulleys, gears and the like driven thereby. If electric motors are employed, they may be placed in fireproof boxes with lightweight ducting extending from the fan blowers to keep the motors cool. The teeth on the auger blade may be similar to those employed on a garden rake or the peripheral edge of the auger blade or flight may have bristles similar to those used in a stiff bristle brush or steel wire brush. The grain sieve 60 may be flat or formed with two troughs of cylindrical configuration generally conforming with the periphery of the augers and the reciprocating movement of the grain sieve serves to shake the grain through the sieve into the grain pan. After the grain passes into the grain pan, the auger and conveyor convey it to the recleaner where it is dropped onto the uppermost sieve which have larger perforations to let grain drop through but will not let grain drop through which has hulls thereon or any material that did not get completely threshed the first time through the thresher cylinder. Thus, the threshed grain which is smaller than grain with hulls thereon will pass through the sieve 126 and 128 while the grain with hulls thereon will pass into one of the troughs 150 and thus ultimately be returned to the threshing cylinder. Variation in the rotational speeds or oscillating speeds of the various components may be made and the inclination of the sieve 126 and 128 may be varied by varying the nature of the wedges or shims thereunder and the windboards can be adjusted to direct air currents in any direction by turning the windboards or by placing the windboard shaft in different holes in the sides of the housing which receives the windboards.

If a threshing cylinder having a central peripheral space is provided, a single auger may be employed with the diameter of the auger being substantially equal to the overall length of the threshing cylinder with the rotational axis of the auger being aligned with the vacant groove or slot in the center of the threshing cylinder. In this event, a perforated cylinder may surround the auger and be reciprocated much in the same manner as the perforated grain sieve 60 is reciprocated except that the single perforated tube around the auger would be reciprocated longitudinally rather than transversely.

If one auger is not adequate for this type of threshing cylinder, then three augers could be used with the middle auger being journaled between the two sections of the threshing cylinder and the outside auger shaft mounted alongside of the cylinder. The cylindrical sleeve around the augers could be oscillated about its longitudinal axis rather than reciprocated along its longitudinal axis. Also, in the recleaner, if additional sieves and outlets are used, it is possible to separate two different kinds of grains. For example, if two different sizes of grains are raised, they can be separated as they pass through the recleaner by adding additional sieves having hole sizes therein of the particular size for enabling passage of smaller grain while precluding passage of larger grain.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be restored to, falling within the scope of the invention as claimed.

What is claimed as new is as follows:

1. A grain separator for use in combination with a grain threshing cylinder and a grate bar assembly comprising an elongated separating chamber communicating with the discharge of the threshing cylinder and receiving threshed grain, straw and chaff therefrom, auger means within said chamber for conveying and agitating the straw, chaff and grain, a perforated grain sieve underlying said auger means having perforations therein of a size to permit passage of grain therethrough, blower means for blowing air through the chamber for entraining lightweight straw and chaff and discharging it exteriorly of the chamber, a grain pan underlying said grain sieve and receiving grain therefrom, and means operatively associated with the grain pan for receiving grain therefrom and recleaning the grain and returning grain with hulls thereon to the threshing cylinder and discharging clean grain into a storage bin, said auger means including a pair of spiral flight augers, each flight having projecting fingers on the peripheral edge thereof for engaging and conveying straw through the chamber while lifting and agitating the material in the chamber to separate grain from the straw and chaff, the spiral flights also being perforated for passage of air therethrough.

2. A grain separator for use in combination with a grain threshing cylinder and grate bar assembly comprising an elongated separating chamber communicating with the discharge of the threshing cylinder and receiving threshed grain, straw and chaff therefrom, auger means within said chamber for conveying and agitating the straw, chaff and grain, a perforated grain sieve underlying said auger means having perforations therein of a size to permit passage of grain therethrough, blower means for blowing air through the chamber for entraining lightweight straw and chaff and discharging it exteriorly of the chamber, a grain pan underlying said grain sieve and receiving grain therefrom, and means operatively associated with the grain pan for receiving a grain therefrom and recleaning the grain and returning grain with hulls thereon to the threshing cylinder and discharging clean grain into a storage bin, said recleaner including a housing having a sieve pan therein oscillatable about a vertical axis for receiving grain thereon, said sieve pan having apertures therein to permit passage therethrough of clean grain and to prevent passage of grain with hulls thereon whereby clean grain will be discharged through the sieve pan, and means receiving grain with hulls thereon discharged from the edge of the sieve pan and returning it to the threshing cylinder, and fan means communicated with the recleaner housing for entraining lightweight material such as chaff therein, means communicating the recleaner housing with the grain separating chamber for air passage whereby the entrained chaff will be discharged back into the separating chamber for discharge exteriorly thereof.

3. The structure as defined in claim 2 wherein said grain sieve is reciprocated to facilitate shaking of grain therethrough.

4. The structure as defined in claim 2 wherein said receiving means for grain with hulls includes a plurality of superimposed trays inclined in a zigzag pattern with an upper tray receiving grain with hulls from the sieve pan and dropping grain with hulls thereon into a lower tray, said fan means inducing air flow through the recleaner housing and entraining chaff therein, and means supporting said sieve pan in inclined position for discharging grain with hulls thereon laterally of the pan.

5. The grain recleaner as defined in claim 4 wherein said housing includes a clean grain outlet at the bottom thereof, and baffle means directing clean grain passing through the sieve pan toward the clean grain outlet.

6. The structure as defined in claim 1 wherein said grain sieve is reciprocated to facilitate shaking of grain therethrough.

7. The structure as defined in claim 6 wherein said grain pan is in the form of a hopper having an auger conveyor at the lower end thereof for conveying grain to the recleaning means.

8. A grain separator for use with a grain-threshing cylinder and grate bar assembly comprising an elongated separating chamber adapted to receive threshed grain, straw and chaff from the threshing assembly, said chamber including a perforated grain sieve defining a bottom therefor, a spiral flight auger extending longitudinally of the chamber in overlying relation to the sieve, said sieve having perforations of a size to permit passage of grain therethrough, said auger having outwardly projecting fingers on the periphery thereof for engaging and conveying material through the chamber while lifting and agitating the material to separate grain from the straw and chaff, blower means for blowing air through the chamber for entraining lightweight straw and chaff and discharging it from the chamber, a grain pan underlying the sieve, and means receiving grain from the grain pan, separating grain with hulls thereon from clean grain, discharging clean grain to storage and returning grain with hulls thereon for recycling through the threshing cylinder and grate bar assembly.

9. The structure as defined in claim 8 wherein said means receiving grain from the grain pan includes a sieve pan having perforations permitting passage of clean grain, means moving said sieve pan in a manner to discharge grain with hulls thereon from the edge of the sieve pan, means collecting the grain with hulls thereon as it drops from the edge of the pan and returning it for recycling it, and means collecting clean grain as it drops through the pan and discharging it to storage.